US011651635B2

(12) United States Patent
Arellano et al.

(10) Patent No.: US 11,651,635 B2
(45) Date of Patent: May 16, 2023

(54) SYSTEM FOR SECURING CONTENTS IN A CONTAINER

(71) Applicant: SECURE PACKAGE SYSTEMS, LLC, Albueuqerque, NM (US)

(72) Inventors: Marc T Arellano, Albuquerque, NM (US); Luis M Ortiz, Albuquerque, NM (US); Thomas Romero, Las Cruces, NM (US)

( * ) Notice: Subject to any disclaimer, the term of this patent is extended or adjusted under 35 U.S.C. 154(b) by 0 days.

(21) Appl. No.: 17/321,199

(22) Filed: May 14, 2021

(65) Prior Publication Data

US 2021/0334750 A1 Oct. 28, 2021

Related U.S. Application Data

(63) Continuation of application No. 17/012,561, filed on Sep. 4, 2020, and a continuation-in-part of application No. 15/915,603, filed on Mar. 8, 2018, now Pat. No. 10,769,875.

(51) Int. Cl.
| | |
|---|---|
| *G06Q 10/08* | (2012.01) |
| *G07C 9/00* | (2020.01) |
| *H04N 7/18* | (2006.01) |
| *G08B 13/196* | (2006.01) |
| *G06Q 10/0836* | (2023.01) |
| *A47G 29/14* | (2006.01) |
| *G08B 13/12* | (2006.01) |
| *G07C 9/33* | (2020.01) |

(52) U.S. Cl.
CPC ....... *G07C 9/00896* (2013.01); *A47G 29/141* (2013.01); *G06Q 10/0836* (2013.01); *G07C 9/33* (2020.01); *G08B 13/126* (2013.01); *G08B 13/196* (2013.01); *H04N 7/183* (2013.01); *H04N 7/188* (2013.01); *A47G 2029/149* (2013.01); *G07C 9/0069* (2013.01); *G07C 9/00563* (2013.01); *G07C 9/00571* (2013.01); *G07C 9/00912* (2013.01); *G07C 2009/0092* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 7,056,035 B2* | 6/2006 | Iida | H01S 5/02453 385/92 |
| 9,759,917 B2* | 9/2017 | Osterhout | G06F 3/011 |
| 2011/0074570 A1* | 3/2011 | Feldstein | G08B 25/009 348/E7.087 |
| 2016/0307380 A1* | 10/2016 | Ho | G10L 17/00 |
| 2018/0049575 A1* | 2/2018 | Yamrick | G06Q 10/0836 |
| 2018/0225628 A1* | 8/2018 | Roy | A47G 29/141 |

* cited by examiner

*Primary Examiner* — Edemio Navas, Jr.

(57) ABSTRACT

A system for securing contents in a container that can include a housing, at least one electromechanically operated security door securing access to the housing and a control panel for receiving input to release the electromechanically secured door from the housing. Communications components, alarms and cameras can also be associated with the housing to facilitate its security and operation and can also adapt it for access and/or package receipt (delivery) by a third party, and overall preservation and security of contents stored therein. Heating and cooling system components can maintain contents of valuable contents held within the housing at a select temperatures.

16 Claims, 4 Drawing Sheets

SYSTEM FOR SECURING CONTENTS IN A CONTAINER

INVENTION PRIORITY

The present invention is a continuation of U.S. Non-Provisional patent application Ser. No. 17/012,561, filed Sep. 4, 2020, entitled ""SYSTEM FOR SECURING DELIVERED PACKAGES", which is a Continuation-In-Part of U.S. Non-Provisional patent application Ser. No. 15/915,603, filed Mar. 8, 2018 and entitled "SYSTEM FOR SECURING DELIVERED PACKAGES", which is a continuation of U.S. Provisional Patent Application Ser. No. 62/468,609, filed Mar. 8, 2017 and entitled "SYSTEM FOR SECURING DELIVERED PACKAGES", and both are herein incorporated by reference.

TECHNICAL FIELD

The embodiments are generally related to security containers. More particularly, embodiments of the invention are related to systems including secured container for securing contents therein.

BACKGROUND

Contents, such as delivered packages, need to be secured outside as well as within a premises. Contents are valuables, whether they are kept within a premises or are newly delivered.

The trend of packages left on doorsteps being stolen continues to exponentially rise across the country. Delivery services such as FEDEX, DHL, and UPS often leave packages at front door steps of homes for the intended recipient to retrieve. The typical routine is for a doorbell to be rang, or the front door knocked, and then for the package to be left by the front doorway for the customer, regardless of whether the customer is home or not. This is a problem. This is why packages are being stolen. There is no way for packages to be secured from theft, weather damage or the curiosity of animals.

An emerging issue associated with package delivery as it has now become mainstream is with the security and protection of delivered packages. As on-line shopping continues to rise, the theft or damage of unattended packages will continue to rise. Packages continue to be left near front doorways. Unless there is a recipient waiting to receive the package, it will typically sit in the open where is unsecured and subject to damage from weather or interference from pets or other animals.

Another problem with package delivery is experienced where product is perishable or should be kept at a certain temperatures (hot, warm or cold). Such is the case with pharmaceuticals, such as insulin, which can be delivered by package delivery to diabetic patients. Food, such as pizza or warm food or cold milk, can also sometimes received at a residence and left at a doorway without a means to maintain the products temperature.

A problem with typical safes are that they are not easily accessible, especially by third parties (e.g., delivery person, relative, friends, neighbors) for whom a safe owner may desire to grant/allow access.

What is needed is a system that can secure contents, such as packages delivered by package delivery services, that better facilitates owner control and allow for third party access. What is also needed are security containers that can also maintain a selected temperature for the package in the event it may be food or pharmaceuticals.

SUMMARY OF THE EMBODIMENTS

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

The only way to prevent package theft is to increase the physical security efforts over packages at the time of delivery and afterward, outside of a premises or within a premises. It is a feature of the disclosed embodiments to provide a system for use to secure contents, such as packages, within a secure container. Accordingly, a housing provided in the form of a box that can be secured, such as a safe, can be provided with an electromechanically secured and/or operated security door that can control access by owners and third parties to the contents such a delivered packages or other valuables inside the housing.

It is yet another feature of the disclosed embodiments to provide a control panel in association with the housing and/or security door including a user interface for authorized user to interact with the system and provide a pin number, biometric or wireless code (e.g., from a smartphone, tablet or RFID tag) to unlock the security door associated with the housing an allow the authorize user to access to contents stored inside the housing.

It is another feature of the disclosed embodiments to provide a notification message to content owners and package recipients when securing contents within the system and when a package has been delivered to the system. Notification can be via a data network (e.g., WiFi, Cellular) using SMS or email as delivery notifications.

It is another feature of the disclosed embodiments that package delivery can be sensed using sensor, or indicated based on user access to the system via the control panel. When sensed, a notification message can be sent to registered recipients.

It is yet another feature of the disclosed embodiments for electromechanical and communication components associated with the housing to be powered by a solar-powered and battery recharging source.

It is yet another feature of the disclosed embodiments for electromechanical components to include a locking, unlocking mechanism for the door.

It is yet another feature of the disclosed embodiments for electromechanical components to include a locking-unlocking mechanism for the door that can be actuated by at least one of: a key, RFID tag, smartphone/tablet computer, a biometric provided to a biometric reader, a signal provided via wired or wireless signal to communication components associated with the housing.

It is yet another feature of the disclosed embodiments for the housing to include a security alarm to protect the housing and any packages contained therein from tampering or theft.

It is yet another feature of the disclosed embodiments for the housing to include a security alarm to protect the housing and any packages contained therein from tampering or theft by communicating any anomalies to a remote security monitoring service or system.

It is yet another feature of the disclosed embodiments for the housing to include a camera, e.g., a 360-degree security camera, to monitor, record and/or transmit activity near the housing.

It is yet another feature of the disclosed embodiments for the housing to include a security camera to monitor, record and/or transmit activity near the housing in response to an alarm or detection of activity near the housing via sensors (e.g., motion, tampering or thermal sensors).

It is yet another feature of the disclosed embodiments for the housing to include a heating and cooling system that can maintain the interior of the housing at a select temperatures (hot, warm or cold).

DRAWINGS

The accompanying figures, in which like reference numerals refer to identical or functionally similar elements throughout the separate views and which are incorporated in and form a part of the specification, further illustrate the disclosed embodiments and, together with the detailed description of the invention, serve to explain the principles of the disclosed embodiments.

DETAILED DESCRIPTION OF THE EMBODIMENTS

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or" as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" or "at least one" as used herein, depending at least in part upon context, may be used to describe any feature, structure, or characteristic in a singular sense or may be used to describe combinations of features, structures, or characteristics in a plural sense. Similarly, terms such as "a", "an", or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an example embodiment", "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a Personal Computer (PC), a desktop computer, a mobile computer, a laptop computer, a notebook computer, a tablet computer, a Smartphone device, a smartwatch, an RFID tag, wearable computing devices, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a cellular network, a cellular node, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, vending machines, sell terminals, and the like.

Note that the term "server" as utilized herein refers generally to a computer that provides data to other computers. Such a server can serve data to systems on, for example, a LAN (Local Area Network) or a wide area network (WAN) over the Internet. Many types of servers exist, including web servers, mail servers, and files servers. Each type can run software specific to the purpose of the server. For example, a Web server may run Apache HTTP Server or Microsoft IIS, which both provide access to websites over the Internet. A mail server may run a program such as, for example, Exim or iMail, which can provide SMPT services for sending and receiving email. A file server might utilize, for example, Samba or the operating system's built-in file sharing services to share files over a network. A server is thus a computer or device on a network that manages resources. Other examples of servers include print servers, database servers and so on. A server may be dedicated, meaning that it performs no other tasks besides their server tasks. On multiprocessing operating systems, however, a single computer can execute several programs at once. A server in this case may refer to the program that is managing resources rather than the entire computer.

Some embodiments may be used in conjunction with devices and/or networks operating in accordance with existing Long Term Evolution (LTE) specifications, e.g., "3GPP TS 36.304 3rd Generation Partnership Project; Technical Specification Group Radio Access Network; Evolved Universal Terrestrial Radio Access (E-UTRA); User Equipment (UE) procedures in idle mode"; "3GPP TS 36.331 3rd Generation Partnership Project; Technical Specification Group Radio Access Network; Evolved Universal Terrestrial Radio Access (E-UTRA); Radio Resource Control (RRC); Protocol specification"; "3GPP 24.312 3rd Generation Partnership Project; Technical Specification Group Core Network and Terminals; Access Network Discovery and Selection Function (ANDSF) Management Object (MO)"; and/or future versions and/or derivatives thereof, units and/or devices which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee®, Ultra-Wideband (UWB), Global System for Mobile communication (GSM), second generation (2G), 2.5G, 3G, 3.5G, 4G, 5G, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1.times.RTT), Evolution-Data Optimized (EV-DO), Enhanced Data rates for GSM Evolution (EDGE), and the like. Other embodiments may be used in various other devices, systems and/or networks.

The phrase "hand held device" and/or "wireless device" and/or "mobile device" and/or "portable device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the phrase "wireless device" and/or "mobile device" may optionally include a wireless service and may also refer to wearable computing devices such as smartwatches.

A "hand held device" or HHD is a type of mobile device or wireless device, which can be held in one's hand during use, such as a smart phone, personal digital assistant (PDA), tablet computing device, laptop computer and the like. It can be appreciated that such devices are not hand held devices and do not constitute an HHD since they are not used as "hand held devices" but as other types of computing devices, such as wearable computing devices. The example embodiments herein primarily describe methods and systems involving hand held devices. It can be appreciated, however, that other mobile devices such as wearable computing devices can be utilized in place of a hand held device (wearable devices are not "hand held devices" because are intended to be used in a user's hands but instead worn by the user) or may be utilized with other hand held devices. For example, venue-based data as discussed herein can be streamed not only to hand held devices but also to other mobile computing devices such as wearable computing devices.

The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some demonstrative embodiments are described herein with respect to a LTE cellular system. However, other embodiments may be implemented in any other suitable cellular network, e.g., a 3G cellular network, a 4G cellular network, a 5G cellular network, a WiMax cellular network, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The terms "cell" or "cellular" as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated, for example, in system information transmitted on the downlink resources.

Access points, which are often interconnected by cabling, generally play a dominant role in providing radio frequency (RF) coverage in most wireless LAN (WLAN) deployments. Wireless repeaters, though, are an alternative way to extend the range of an existing WLAN instead of adding more access points. There are very few stand-alone 802.11 wireless repeaters on the market, but some access points have a built-in repeater mode. The wireless communications electronics representing access points and wireless repeaters will be referred to herein as communications system nodes, or simply as communications nodes.

In general, a repeater simply regenerates a network signal in order to extend the range of the existing network infrastructure. A WLAN repeater does not physically connect by wire to any part of the network. Instead, it receives radio signals (802.11 frames) from an access point, end user device, or another repeater and retransmits the frames. This makes it possible for a repeater located in between an access point and distant user to act as a relay for frames traveling back and forth between the user and the access point.

Figure 1:
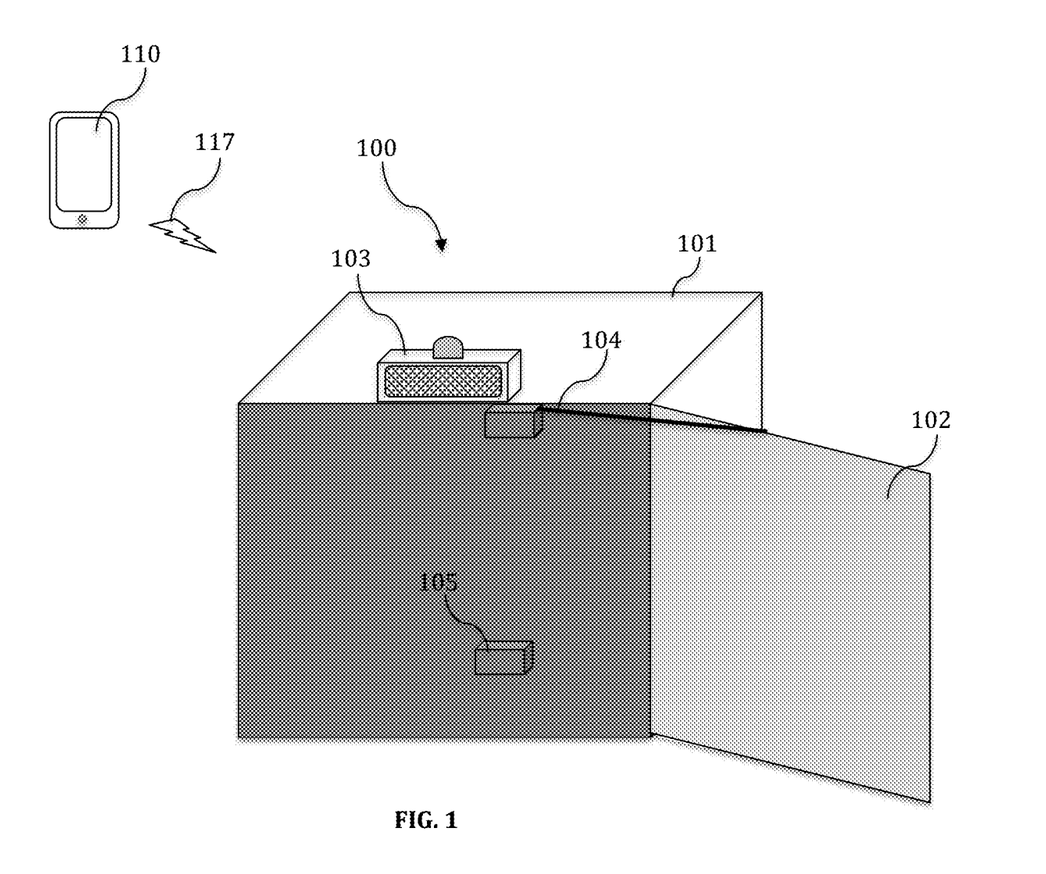
FIG. 1 illustrates a system for securing contents including delivered packages, in accordance with features of the embodiments.

Referring to FIG. 1, a system for securing contents 100 (e.g., such as a delivered package) in accordance with features of the embodiments is illustrated. A system 100 akin to a safe is uniquely adapted for receiving and securing valuable contents placed therein by its owners as well as packages delivered by services such as UPS, FEDEX, and DHL, or any other services that may become involved in package delivery. At a minimum, it is preferred that a system 100, like a safe, include a housing 101, at least one electromechanically locked door 102, and a control panel 103. The housing 101, however, can ideally be designed in the form of a box as shown in FIG. 1 that includes at least four panels and an electronically lockable door 102, e.g., a safe, to secure any contents placed therein from weather and theft. The housing 101 and door 102 can be made of any material that will fulfill the need for protection from weather and theft, including steel, aluminum, plastic, wood, composite materials, or any combination.

The control panel 103 can be provided to manage control of the electromechanically locked door 102. Components 105 associated with the control panel 103 can be located within the housing. The system control unit 103 is shown located outside of the housing 101 for exemplary purposes only. The control panel 103 can also serve as the locking-unlocking mechanism for the door 102 (or doors) when co-located near the opening of the housing 101 near the door 102. Components associated with the control panel can include communications components to enable wireless communication with users to include SMS/email messaging to owners of the system 101 or messages to authorized delivery personnel located near the housing 101 to retrieve a temporary code for accessing the housing 101. The door 102 can be electromechanically operated by door hardware 104. Door hardware 104 can be provided to facilitate electromechanical opening and closing of the door 102 and can include a rod, bar, track, rail, telescoping system, arms, or any other means to facilitate the opening and closing of doors from a housing. Electromechanical operation of door hardware 104 in association with the door 102 can be by one or any combination of electromechanical, pneumatic, hydraulic, electromagnetic system. Door hardware 104 can also include an electromagnetic or eletromechanical locking and unlocking mechanism operated in association with the control panel 103.

Figure 2:
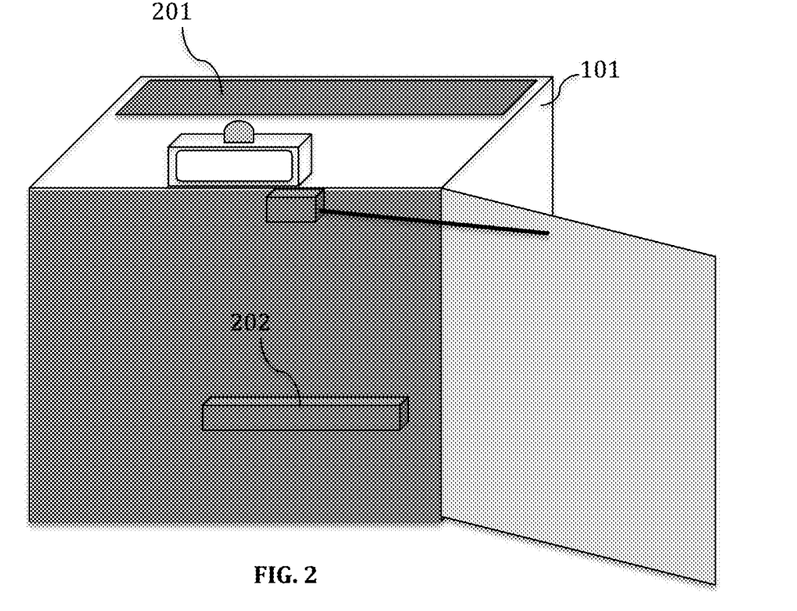
FIG. 2 illustrates a system for securing contents including delivered packages that can include solar power, in accordance with additional features of the embodiments.

Referring to FIG. 2, illustrated is a system 100 in accordance with features of the embodiments that includes a solar panel 201 and rechargeable batteries 202. In placements or field deployments where power and communications connections are not feasible or possible, it would be desirable to provide solar power capabilities. A solar panel can be mounted to the top surface of the housing 101 while batteries 202 (including charging control circuitry) can be located within the housing 101, as shown.

Figure 3:
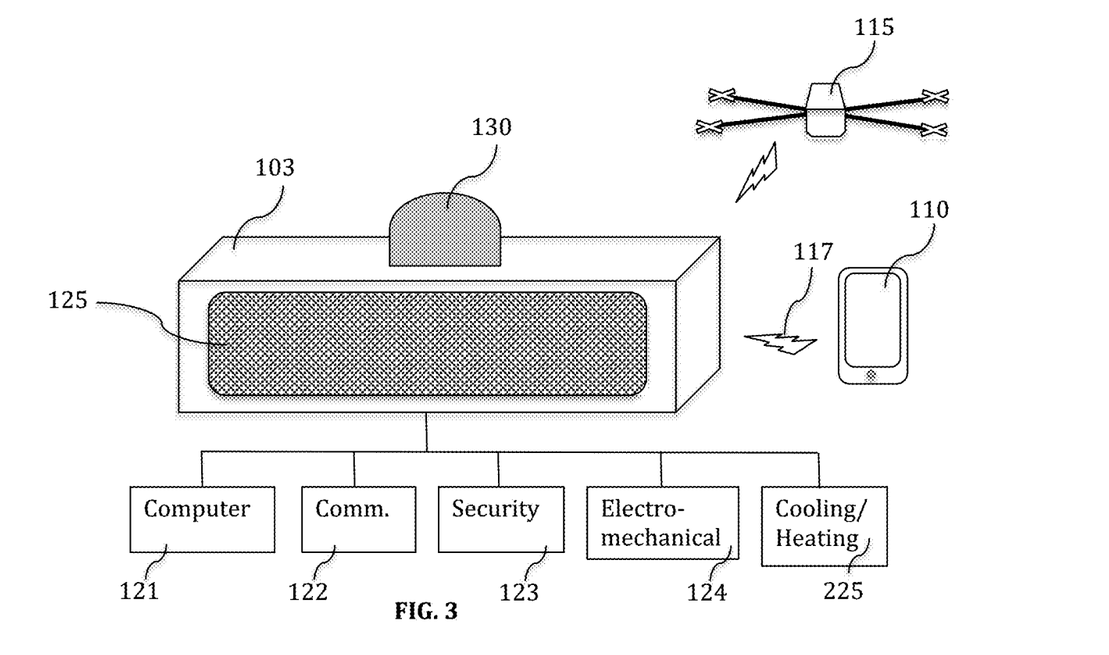
FIG. 3 illustrates a control panel and associated components that can be included with the housing of a system for securing contents including delivered packages in the housing, in accordance with features of the embodiments.

Referring to FIG. 3, diagram of the system control unit 103 is further illustrated. A system control unit 103 can include a computer 121, communications components 122, security components 123, electromechanical control components 124, and cooling/heating system components 225, either within or in association with the system control unit 103, in accordance with additional embodiments, is illustrated. The computer 121 can enable overall control of the electromechanical, security and communications features of the system 101. The communications components 122 can facilitate wireless communications 117 with a portable handheld device 110 (either short range over data network communications), which can typically be carried by a user to deliver to or access packages within the housing 101 by causing the door 102 to unlock and/or open to facilitate provide or retrieve packages in association with the housing 101. The electromechanical control component 124 can facilitate unlocking of the electromechanical locking mechanism associated with the door hardware 104 and the door 102. The communications components 122 can also facilitate wireless communications with authorized personnel near the housing 101, and enable the opening of doors 102. It should also be appreciated that the communications components 122 can facilitate communication over wireless and wired data communications networks 117 (such as satellite and cellular communications services) to access, or to be accessed by, remote system (e.g., remote servers and operators for messaging or alarm notification). Cooling/heating system components 225 can be provided in the form of a heating/cooling pump system, thermoelectric systems and others compact forms for generating heat or cool temperature within the housing 101. For example, thermoelectric cooling uses the Peltier effect to create a heat flux at the junction of two different types of materials. A Peltier cooler, heater, or thermoelectric heat pump is a solid-state active heat pump that can transfer heat from one side of the device to the other, with the consumption of electrical energy, depending on the direction of the current. It can also be used to generate heat.

A user interface 125 can be provided as part of the control unit 103 to facilitate a user's (owner manager of the box) ability to remotely open doors 102 for a third party (e.g., delivery personal) in order to enable access to within the housing 101 for the placement of packages to be securely held within the housing 101. A locking mechanism in association with the system control unit 103 can also unlock the door 102 (or a doors) to the housing 101 directly (e.g., with a code key RFID or biometric) and enable a person with access inside the housing 101. The user interface 125 can include a variety of user controls that can be physically accessed by a user to obtain access to within the housing 101, including any combination of: touch-sensitive display screens, biometric readers key locks, buttons, RFID readers, switches, lights, etc.). A pin number, biometric, wirelessly provided signal (RFID code, or signal from smartphone/tablet) or regular key can be used to obtain access via the system control unit 120.

Security components 123 can provide sensors and alarms if intrusion is detected. Sensor can include those that provide an indication of an event that is related to motion thermal and environmental events. A sensor can also monitor the presence of a package within the housing. Any condition can trigger an alarm at the housing 101. A signal can also be provided over a communications network 117 to remote alarm monitoring services or a user's remote portable device 115. A 360-degree security camera 130 can also be provided as a security feature to provide a user or remote monitors the ability to view activity around the housing 101.

A service can be provided to operate in association with the system 100 and authorized users (e.g., delivery person) by enabling temporary access via RFID tag, pin number, biometric when the users are is close proximity to the device, or within a short timeframe (delivery window). The communication components 122 can also operate in real-time with a remote service to enable real-time access to the housing 101 once the user is verified/authenticated at the housing 101. As an example, the owner of the system 100 (residential owner with a housing outside their front door) can order product from an online store. At completion of the order, the online store can ask if a secured package delivery housing is in use at the residence. If the answer is yes, the online service can ask for a pin number from the user (customer). The pin can be used by an assigned delivery person to access the housing. The pin can be activated within the control unit 103 after the order is processed, or when the delivery person is present near the housing based on a determination of proximity. In another exemplary scenario, a customer can accept the service's access to the housing upon delivery and the service can transmit a temporary access code of its own directly to the identified housing 101 and control unit 103, either after ordering or on the day of delivery.

It should be appreciated that the system 100 can be utilized by its owner for more than just package delivery. The receipt of items from associates (e.g., friends), whether utilized indoors within a premises or outdoors, can also be possible when the owner is not at the location with the assignment of temporary pins via a data network and communication with the control unit 103. The 360-degree camera can be used to verify/authenticate third parties that are dropping off or picking up a package or item from the housing 101.

Figure 4:
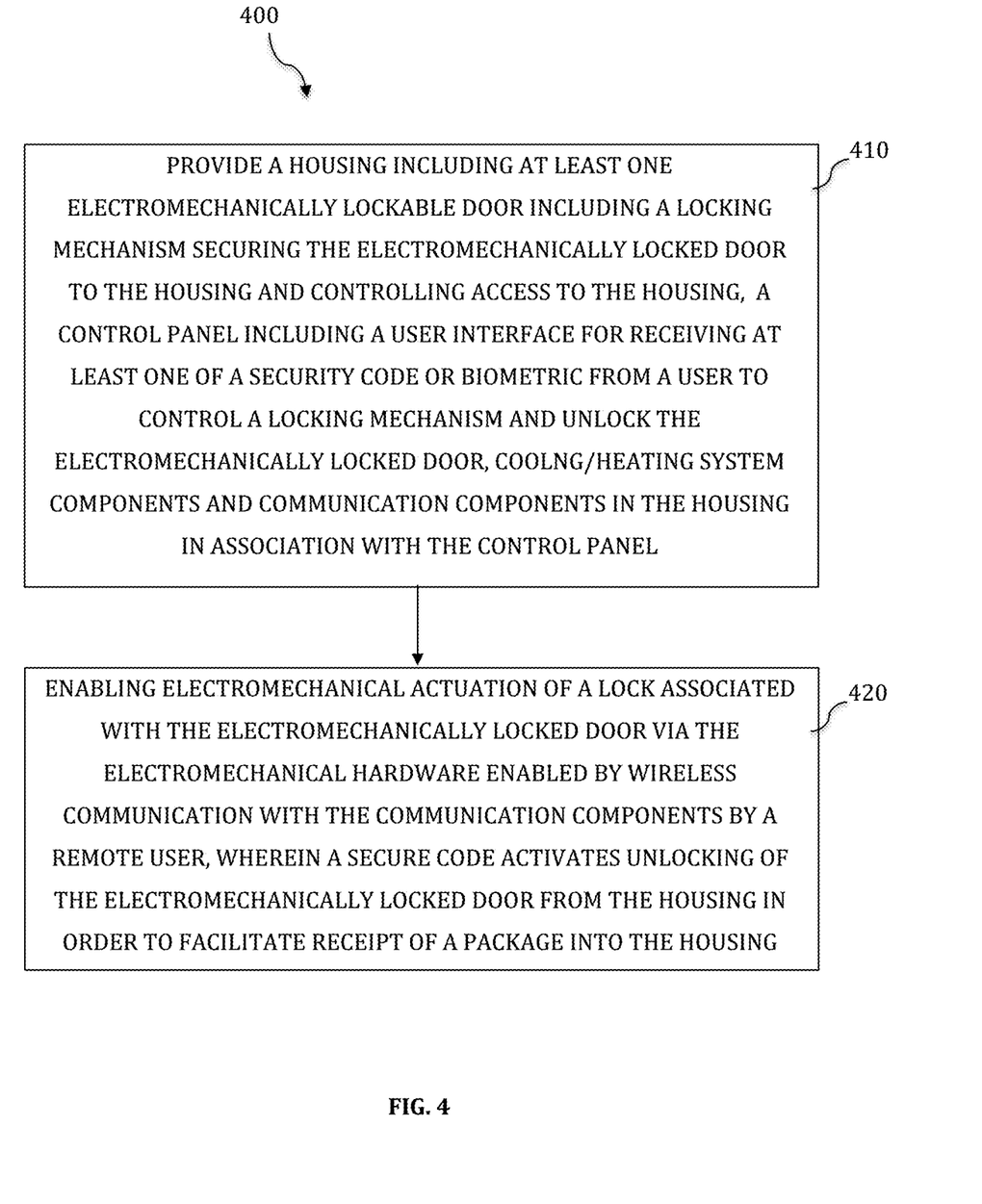
FIG. 4 illustrates a method for securing delivered packages, in accordance with features of the embodiments.

FIG. 4 illustrates a flow diagram of a method 400 of securing delivered packaged in accordance with the embodiment. As shown in Block 410, a housing including at least one electromechanically lockable door including a locking mechanism securing the electromechanically locked door to the housing and controlling access to the housing, a control panel including a user interface for receiving at least one of a security code or biometric from a user to control a locking mechanism and unlock the electromechanically locked door, cooling/heating system components and communication components in the housing in association with the control panel is provided. In block 420, electromechanical actuation of a lock associated with the electromechanically locked door is enabled via the electromechanical hardware enabled by wireless communication with the communication components by a remote user, wherein a secure code activates unlocking of the electromechanically locked door from the housing in order to facilitate receipt of a package into the housing, which can be by a third party such as a delivery person.

Figure 5:
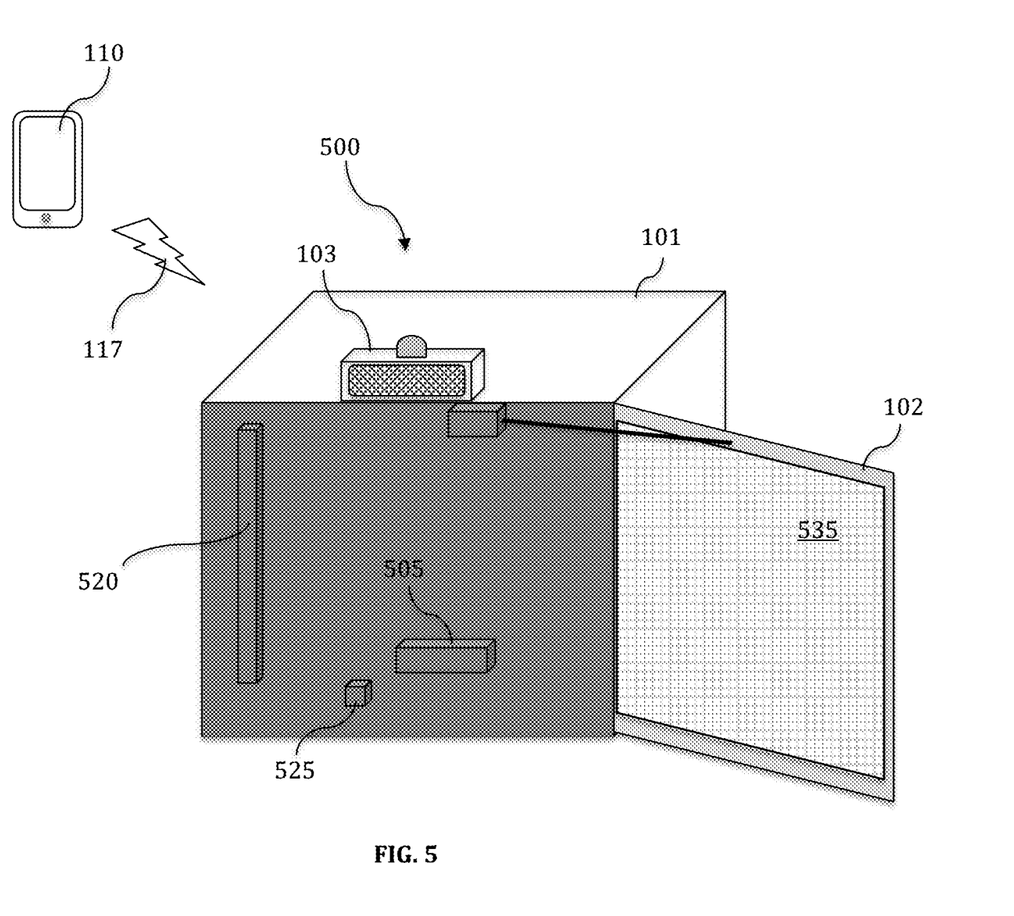
FIG. 5 illustrates a system for securing delivered packages including a heating and cooling system that can maintain contents within the housing at select temperatures, in accordance with additional features of the embodiments.

Referring to FIG. 5, illustrated is an alternative embodiment of a system for securing delivered packages 500 (similar to shown in FIG. 1) that can include a Cooling/Heating system components 520 disposed within the housing 101 that can maintain a package 505 of contents within the housing at select temperatures. The housing 101 can be designed to secure any package 505 placed therein from weather and theft, and additionally can maintain package 505 held therein at a select temperature (cold, warm or hot). Temperature selection for the heating and cooling system 520 can be selected at the control panel 103. Temperature selection can also be determined remotely via access by a remote client 110 to the control panel 103 via a data network 115. A remote client 110 can select the temperature, which can be communicated wirelessly 117 to the system for securing delivered package 500 at the control panel 103 or alternatively directly at the heating and cooling system 520. Alternatively, a sensor 525 located within the housing 501 can detect the temperature of a package 505 (e.g., groceries, good, ice cream, pharmaceutical) place within the housing 101, and then the control panel 103 and/or the heating and cooling system 520 can be automatically set to maintain the temperature sensed by the sensor 525 until the package 505 is safely retrieved from the secured housing 101 by its intended recipient. The housing 101 and door 102 can be made of or include thereon insulating material 535 that will fulfill the need for protection from weather and theft, and also insulate the housing so that contents held there within can be maintained at a select temperature so that a package contained therein will not spoil or become damaged.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

The invention claimed is:

1. A system for securing contents, comprising:
   a safe configured for storing contents therein and for placement within or near a premises, including one electromechanically lockable door and further including a locking mechanism that includes electromechanical hardware to unlock and lock the electromechanically lockable door and that is adapted for securing the electromechanically lockable door to the safe and controlling access to a containment area defined within the safe;
   at least one sensor located in the containment area of the safe adapted to monitor at least one of access to the safe, the presence of contents in the safe and a temperature within the safe;
   a control panel including a user interface for receiving at least one of a security code from an owner and a temporary code provided wirelessly to a third party assigned temporary access to the safe by the owner, the security code and the temporary code accepted by the control panel to control the locking mechanism thereby enabling secured access to the containment area by the owner and the third party assigned temporary access to the safe via the lockable door; and communication components coupled to the control panel and the at least one sensor providing remote data network access to a status of the safe and remote operation of the control panel by the owner.

2. The system of claim 1, further comprising a heating and cooling system disposed in the housing and responsive to temperature selected from at least one of the control panel, a remote client or the at least one sensor to maintain a temperature within the safe.

3. The system of claim 1, wherein electromechanical actuation of a lock for the electromechanically locked door by the electromechanical hardware is further enabled via wireless communication with the communication components remotely by the owner, wherein a secure code activates unlocking of the electromechanically locked door from the safe in order to facilitate receipt of a package into the safe from the third party.

4. The system of claim 1, wherein electromechanical actuation of a lock for the electromechanically locked door by the electromechanical hardware is further enabled via wireless communication with the communication components by a remote server in association with the third party when the location services associated with the third party indicates to the server that the third party is in close proximity to the safe.

5. The system of claim 2, wherein the electromechanical hardware and the communication components are powered by a solar-powered and battery rechargeable source.

6. The system of claim 1, wherein the locking mechanism further comprises at least one of a keyed lock, biometrically controlled lock, or a wirelessly actuated lock, wherein the door that can be actuated by the owner using at least one of: a key, a biometric provided to a biometric reader, or a signal provided wirelessly to communication components associated with the locking mechanism and the safe.

7. The system of claim 1, further comprising a security alarm associated with the safe to protect the housing and any packages contained therein from tampering or theft.

8. The system of claim 1, wherein the safe further comprises a security alarm adapted to protect the safe and any packages contained therein from tampering or theft by wirelessly communicating a signal indicating any anomalies to a remote security monitoring service or system.

9. The system of claim 1, further comprising a security camera to monitor, record and/or transmit activity occurring near the safe.

10. The system of claim 1, further comprising a security camera to monitor, record and/or transmit activity near the safe in response to an alarm or detection of activity near the safe via sensors.

11. A system for securing contents, comprising:

a safe including insulated panels defining a box shape and an insulated door hingedly integrated in one insulated panel of the insulated panels and configured for placement in or near a premises;

one electromechanically lockable and insulated door including a locking mechanism securing the electromechanically lockable and insulated door to the at least one panel of the insulated panels, wherein the locking mechanism further comprises at least one of a keyed lock, biometrically controlled lock, or a wirelessly actuated lock, wherein the door that can be actuated by a user using at least one of: a key, a biometric provided to a biometric reader, or a signal provided wirelessly to communication components associated with the locking mechanism and the safe;

a heating and cooling system disposed in the housing and responsive to temperature selected from at least one of the control panel or a remote client to maintain a temperature within the safe;

a control panel including a user interface for receiving at least one of a security code or biometric from a user to control a locking mechanism and unlock the electromechanically locked door;

communication components in the safe in association with the control panel, wherein electromechanical actuation of a lock for the electromechanically locked door by the electromechanical hardware is further enabled via wireless communication with the communication components by a remote user, wherein a secure code activates unlocking of the door from the safe in order to grant access within the safe third parties, wherein electromechanical actuation of a lock for the electromechanically locked door by the electromechanical hardware is further enabled via wireless communication with the communication components by a remote server in association with a delivery person as the third party when the location services associated with the delivery person indicates to the server that the delivery person is in close proximity to the safe;

a security alarm adapted to protect the housing and any packages contained therein from tampering or theft by wirelessly communicating a signal indicating any anomalies to a remote security monitoring service or system; and a security camera to monitor, record and/or transmit activity near the safe in response to an alarm or detection of activity near the safe via sensors.

12. The system of claim 11, wherein the electromechanical hardware and the communication components are powered by a solar-powered and battery rechargeable source.

13. A method for securing contents within a safe, comprising:

providing a housing including at least one electromechanically lockable door including a locking mechanism securing the electromechanically locked door to the housing and controlling access to the housing, a control panel including a user interface for receiving at least one of a manually entered security code, wirelessly transmitted code when in close proximity to the housing or biometric from a user provided the control panel to control a locking mechanism and unlock the electromechanically locked door, electromechanical hardware and communication components in the housing in association with the control panel supporting wireless communications with remote users, and heating and cooling system components disposed in the housing and responsive to temperature selected from at least one of a sensor, the control panel or a remote client to maintain a preselected temperature within the housing;

enabling electromechanical actuation of a lock associated with the electromechanically locked door via the electromechanical hardware enabled by physical input on the control panel by a third party or wireless communication with the communication components by a remote user, wherein a secure code activates unlocking of the electromechanically locked door from the housing in order to facilitate access to within the housing by a third party;

wherein an owner coordinates receipt of a package from a third party, provides the third party with a security code for its delivery person to access the safe, and the third party utilizes the security code to open the housing utilizing at least one of the control panel or a handheld device in short range communication with the control panel.

14. The method of claim 13, wherein electromechanical actuation of a lock for the electromechanically locked door by the electromechanical hardware is further enabled via wireless communication with the communication components by a remote server in association with a third party when the location services associated with the third party indicates to the server that the third party is in close proximity to the housing.

15. The method of claim 13, wherein the locking mechanism further comprises at least one of a keyed lock, biometrically controlled lock, or a wirelessly actuated lock, and wherein the electromechanically locked door is actuated by a user using at least one of: a key, a biometric provided to a biometric reader, or a signal provided wirelessly to communication components associated with the locking mechanism and the housing.

16. The method of claim 13, further providing a security alarm in association with the housing adapted to protect the housing and any packages contained therein from tampering or theft by wirelessly communicating a signal indicating any anomalies to a remote security monitoring service or system, and a camera in association with at least one of the control panel and the housing to monitor, record and/or transmit activity near the housing in response to an alarm or detection of activity near the housing via sensors.

* * * * *